No. 3,708,510
AMIDES OF CHOLANIC ACID, CHOLENIC ACID, AND CHOLADIENIC ACID
John Hannah, Matawan, N.J., assignor to Merck & Co., Inc., Rahway, N.J.
No Drawing. Filed Sept. 3, 1970, Ser. No. 69,453
Int. Cl. C07c 169/60
U.S. Cl. 260—397.1    11 Claims

ABSTRACT OF THE DISCLOSURE

N-carboxyalkyl amides of 5β-cholanic acid, 5β-cholenic acid and 5β-choladienic acid wherein the unsaturation is within the ring and/or in the 22-position of the aliphatic chain; and various salt, ester and amide derivatives thereof. The products have utility as hypocholesterolemics and hypolipemics.

The products are obtained via the reaction of the appropriate 5β-cholanic acid, 5β-cholenic acid and 5β-choladienic acid with an alkyl haloformate in the presence of a base followed by the reaction of the anhydride thus obtained with a carboxyalkylamine to afford the desired product.

---

This invention relates to a new class of chemical compounds which can be described generally as N-carboxyalkyl amides of 5β-cholanic acid, 5β-cholenic acid and 5β-choladienic acid and to the nontoxic, pharmacologically acceptable salts, esters and amide derivatives thereof. Also, it is an object of this invention to describe a novel method of preparation for the instant products, their salts, esters and amides.

Studies show that cholesterol and triglyceride play a major role in the formation of atherosclerotic plaques by accelerating the deposition of blood lipids on the arterial wall. It is the purpose of this invention to disclose a new class of chemical compounds which effectively reduce the concentration of cholesterol, triglyceride and other lipids in blood serum and, therefore, ameliorate conditions associated with blood lipid deposition.

The 5β-cholanic acid amides, 5β-cholenic acid amides and 5β-choladienic acid amides of this invention are compounds of the following general formula:

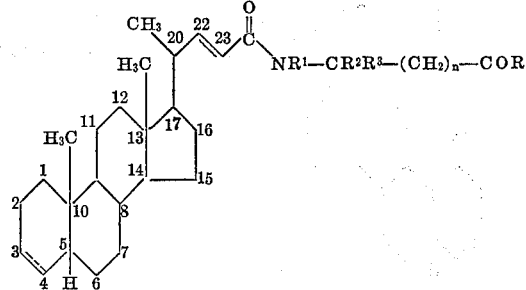

wherein R is hydroxy, alkoxy, for example, lower alkoxy such as methoxy, ethoxy or n-propoxy and the like, —OM wherein M is a cation derived from a metal of the first group of the Periodic System as, for example, a cation derived from an alkali metal hydroxide, carbonate or nitrate, such as sodium hydroxide, potassium hydroxide, potassium carbonate or silver nitrate and the like, or an amino radical of the formula: —NR⁴R⁵ wherein R⁴ and R⁵ are similar or dissimilar members selected from hydrogen or lower alkyl such as methyl, ethyl, n-propyl and the like and, when R is hydroxy, the nontoxic pharmacologically acceptable acid addition salts of the said acid as, for example, salts obtained by treating the said acid with a primary, secondary or tertiary amine as, for example, methylamine, dimethylamine, triethylamine and the like or with hydrazine or N,N-dimethylhydrazine; $R^1$, $R^2$ and $R^3$ are similar or dissimilar members selected from hydrogen and lower alkyl such as methyl, ethyl, n-propyl and the like, at least one of which $R^1$, $R^2$ and $R^3$ radicals is lower alkyl and $n$ is an integer having a value of 0 or 1.

The dotted line in the 3-position and in the 22-position of the foregoing Formula I is meant to indicate that the instant products may or may not contain an unsaturated double bond within the cholane ring and in the alkylene chain bridging the cholane nucleus and carbonyl carbon, (i.e., —CO—). In addition the dotted line indicates that the point of nuclear unsaturation is not limited to the 3-position but is intended to include as well other nuclear isomeric derivatives as, for example the $\Delta^7$ and $\Delta^{11}$ isomers.

The several varieties of products embraced by this invention are further illustrated by the following planar formulae. Thus, for example, the N-carboxyalkyl-5β-cholanic acid amides and N-carboxyalkyl-$\Delta^{22}$,5β-cholenic acid amides are products having the following general formula:

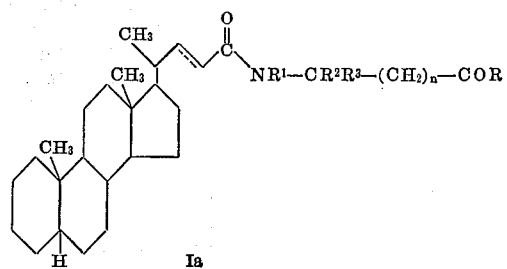

wherein the dotted line indicates that the product may or may not contain an unsaturated double bond in the 22-position and R, $R^1$, $R^2$, $R^3$ and $n$ are as defined above. And the N-carboxyalkyl-$\Delta^{22}$,5β-choladienic acid amides of this invention are products of the following formula:

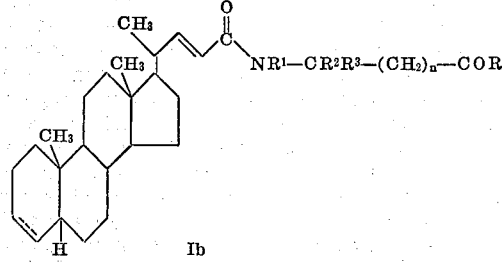

wherein R, $R^1$, $R^2$, $R^3$ and $n$ are as defined above and wherein it is understood that the dotted line representing the $\Delta^3$ double bond can be in any one of several positions in the cholane nucleus as, for example, in the $\Delta^7$ and $\Delta^{11}$ positions, etc.

Also, included within this invention are those isomeric N-carboxyalkyl-5β-cholenic acid amides wherein the double bond is located solely within the carbocyclic nucleus.

Typical of these derivatives are the Δ³ isomers illustrated by planar Formula Ic, infra:

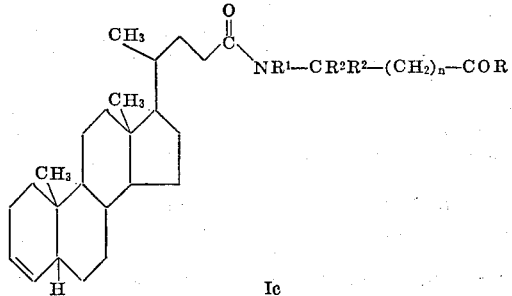

Ic wherein R, R¹, R² and R³ are as defined above. However, it should again be understood that this particular isomer (Id) is simply illustrative of the nuclear unsaturated compounds embraced by this invention and that the unsaturation is not limited to the 3-position but includes all other isomeric derivatives as well as, for example, the Δ⁷ and Δ¹¹ isomers. These products (Ic) effect a significant reduction in the concentration of cholesterol in blood serum and, therefore, like their Δ²² isomers are similarly useful in the treatment of conditions associated with blood lipid deposition.

All of the instant products (I) effectively reduce the concentration of cholesterol and triglyceride in blood serum but it has been found that the N-carboxyalkyl-5β-cholanic acid amides and alkali metal salts thereof (Id, infra) are especially suitable for this purpose. This subclass of compounds combines a high order of activity with little or no adverse side effects and, therefore, represents a preferred subgroup within the scope of this invention. The following formula illustrates this preferred embodiment:

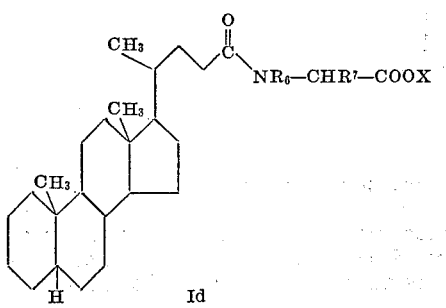

Id wherein R⁶ and R⁷ are hydrogen or lower alkyl as, for example, methyl and the like, at least one of which R⁶ and R⁷ radicals is lower alkyl and X is hydrogen or an alkali metal cation such as sodium or potassium cation.

The presence of the ethylenic double bond in the instant products (I) gives rise to geometrical isomerism, i.e., the possibility of a cis-trans arrangement of functional groups. The desired spatial arrangement is most advantageously achieved by employing as a reactant in the preparative method to be discussed infra either the cis or the trans starting material corresponding to the desired isomeric product; however, it will be appreciated by those skilled in the art that other methods such as well-known physical separation techniques may also be employed. Both the cis and trans varieties of the instant compounds (I) are useful in the treatment of hypercholesterolemia and it is to be understood that both isomeric derivatives as well as the mixtures of those isomers are within the scope of this invention.

The products of this invention are conveniently obtained by treating a 5β-cholanic acid, 5β-cholenic acid or 5β-choladienic acid (II, infra) with an alkyl haloformate in the presence of a base followed by the reaction of the resulting anhydride (III, infra) with an appropriate carboxyalkylamine in a suitable base as, for example, in an aqueous solution of an alkali metal hydroxide such as sodium hydroxide and the like or in the presence of a tri-lower alkylamine such as triethylamine and the like to afford the salt of the desired product (Ie, infra). The N-5β-cholan-24-oyl-, N-5β-cholen-24-oly- or N-5β-choladien-24-oyl-carboxyalkylamine salt thus obtained can then be isolated and purified as the product of the invention or, if desired, the said salt may be converted to the corresponding free acid (If, infra) by treatment with a dilute solution of an acid as, for example, with a mineral acid such as hydrochloric acid or by other conventional techniques as, for example, by passing a solution of the salt in aqueous dimethylformamide or in aqueous methanol through a sulfonated ion-exchange column followed by evaporation of the solvent in vacuo from the resulting eluate. The following equation illustrates this method of preparation:

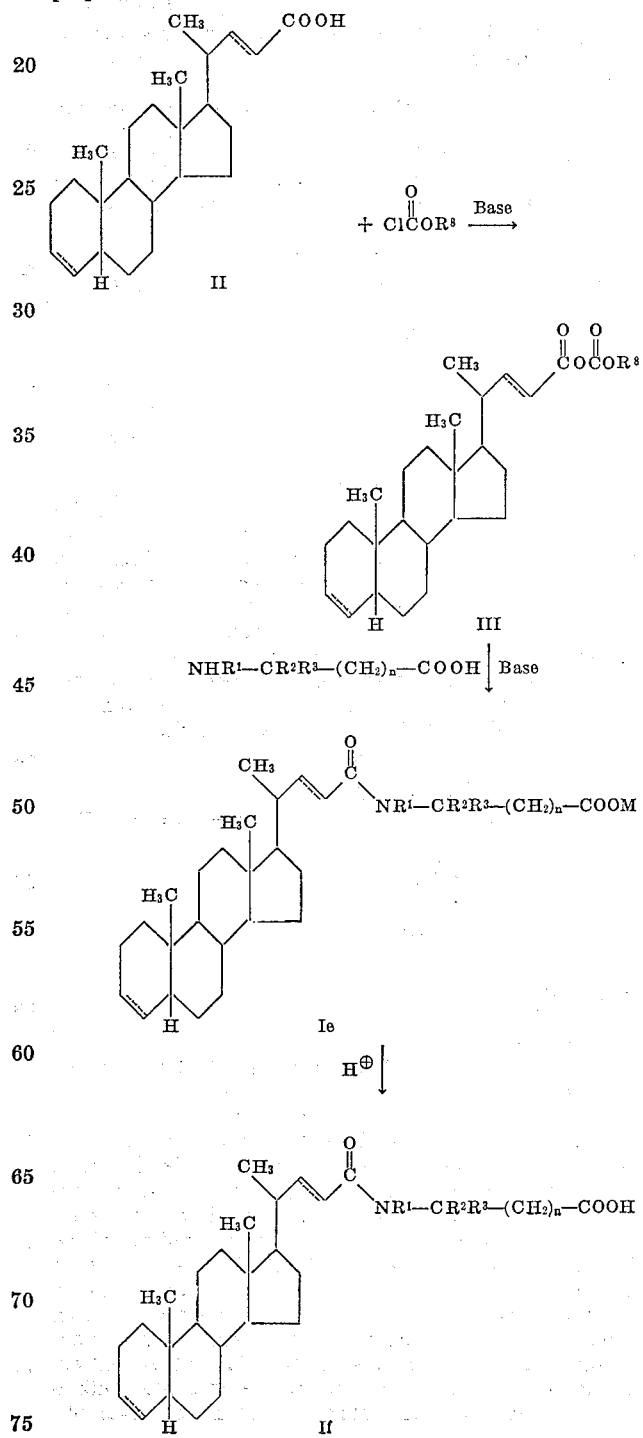

wherein $R^8$ is lower alkyl such as methyl, ethyl, n-propyl and the like and M, $R^1$, $R^2$, $R^3$ and $n$ are as defined above.

The examples which follow illustrate the products of this invention and the methods by which they are prepared. However, the examples are illustrative only and it will be apparent to those having ordinary skill in the art that all of the instant products may be prepared in an analogous manner by substituting the appropriate starting materials for those set forth in the examples.

EXAMPLE 1

N-5β-cholan-2-oyl sarcosine and sodium salt

5β-cholanic acid (2.70 g.; 0.00748 mole) and triethylamine (0.757 g.; 0.00748 mole) were added to 15 ml. of dioxane. The solution was cooled and maintained at 0 to 5° C. and ethyl chloroformate (0.715 ml.; 0.00748 mole) was added whereupon a precipitate formed. The resulting mixture containing 5β-cholanic ethylcarbonic anhydride was then shaken periodically over a 25-minute period and a solution of sarcosine (0.735 g.; 0.00825 mole) in 1 N sodium hydroxide (8.25 ml.) was added to afford the sodium salt of N-5β-cholan-24-oyl sarcosine. After one hour at 0 to 5° C. the mixture was maintained at room temperature overnight. The reaction mixture was then diluted with water, acidified with dilute hydrochloric acid and extracted with two 50 ml. portions of chloroform. The chloroform solution was dried and filtered and the chloroform evaporated to yield 3.52 g. of the sarcosine conjugate of 5β-cholanic acid as a viscous oil which soon solidified. Recrystallization from ethyl acetate yielded 2.32 g. of product having a melting point of 120–126° C. Several recrystallizations from ethyl acetate yields pure N-5β-cholan-24-oyl sarcosine, M.P. 138–140° C.

*Analysis.*—Calculated for $C_{27}H_{45}NO_3$ (percent): C, 75.13; H, 10.51; N, 3.21. Found (percent): C, 74.86; H, 10.49; N, 3.25.

Upon substituting an equivalent amount of $\Delta^{7,22}$-5β-choladienic acid and $\Delta^{11,22}$-5β-choladienic acid for the 5β-cholanic acid of the preceding paragraph and following the procedure described therein there is thus obtained N-5β-chola-$\Delta^{7,22}$-dien-24-oyl sarcosine and corresponding sodium salt, and N-5β-chola-$\Delta^{11,22}$-dien-24-oyl sarcosine and corresponding sodium salt.

EXAMPLE 2

N-5β-cholan-24-oyl DL-alanine and sodium salt

5β-cholanic acid (2.70 g.; 0.00748 mole) and triethylamine (0.757 g.; 0.00748 mole) were dissolved in dioxane (15 cc.) and the mixture was cooled in an ice bath. Ethyl chloroformate (0.715 ml.; 0.00748 mole) was added whereupon a precipitate formed. The mixture containing 5β-cholanic ethylcarbonic anhydride was stirred for 15 minutes at ice-bath temperature and a solution of DL-alanine (0.735 g.; 0.00825 mole) in 1.0 N sodium hydroxide (8.25 ml.) was added. The resulting suspension of sodium salt of N-5β-cholan-24-oyl DL-alanine was stirred for one hour at ice-bath temperature and then acidified with hydrochloric acid. The organic material was extracted with two 30 ml. portions of ether and then dried and filtered to afford a crystalline precipitate which could not be redissolved in ether. This ethereal suspension was brought to dryness to yield 3.04 gm. of N-5β-cholan-24-oyl DL-alanine. The crude product was extracted several times with hot ether to afford 0.984 g. of insoluble product. A portion of this material (0.10 g.) was then recrystallized from ethyl acetate (1.5 c.) to yield 86 mg. of N-5β-cholan-24-oyl DL-alanine having a melting point of 183–188° C. This material was again recrystallized from ethyl acetate (1.1 cc.) to afford 69 mg. of pure N-5β-cholan-24-oyl DL-alanine having the same melting point.

*Analysis.*—Calculated for $C_{27}H_{45}NO_3$ (percent): C, 75.13; H, 10.51; N, 3.21. Found (percent): C, 75.14; H, 10.46; N, 3.39.

Upon substituting an equivalent amount of $\Delta^{22}$-5β-cholenic acid for the 5β-cholanic acid of the preceding paragraph and following the procedure described therein there is thus obtained N-5β-chol-22-en-24-oyl DL-alanine and the corresponding sodium salt.

EXAMPLE 3

N-5β-cholan-24-oyl β-alanine and sodium salt

5β-cholanic acid (2.70 g.; 0.00748 mole) and triethylamine (0.757 g.; 0.00748 mole) were added to dioxane (15 cc.) and the solution cooled in an ice-bath. Ethyl chloroformate (0.715 ml.; 0.00748 mole) was added and the resulting suspension was shaken periodically for 25 minutes at ice-bath temperature. To the resulting solution of 5β-cholanic ethylcarbonic anhydride was added β-alanine (0.725 g.; 0.00825 mole) in 1.0 N sodium hydroxide (8.25 cc.). The mixture, containing the sodium salt of N-5β-cholan-24-oyl β-alanine, was kept cool for one hour and then allowed to come to room temperature overnight. The mixture was then diluted with water (50 cc.) and acidified with dilute hydrochloric acid. The suspension was shaken with two 50 cc. portions of chloroform and the combined chloroform extracts were then dried to afford 3.31 g. of N-5β-cholan-24-oyl β-alanine. Recrystallization from ethyl acetate (3 ml.) yielded 2.79 g. of product. An additional sample (0.250 g.) recrystallized from ethyl acetate (3 cc.) afforded pure N-5β-cholan-24-oyl β-alanine, M.P. 132–137° C.

*Analysis.*—Calculated for $C_{27}H_{45}NO_3$ (percent): C, 75.13; H, 10.51; N, 3.21. Found (percent): C, 75.06; H, 10.31; N, 3.44.

Upon substituting an equivalent amount of $\Delta^7$-5β-cholenic acid for the β-cholanic acid of the preceding paragraph and following the procedure described therein there is thus obtained N-5β-chol-7-en-24-oyl β-alanine and the corresponding sodium salt.

EXAMPLE 4

N-5β-chol-3-en-24-oyl DL-alanine

By substituting an equivalent amount of $\Delta^3$-5βcholenic acid and methyl chloroformate for the 5β-cholanic acid and ethyl chloroformate of Example 1 and following substantially the procedure described therein there is thus obtained a solution of $\Delta^3$-5β-cholenic methylcarbonic anhydride which, upon treatment with a solution of sarcosine (0.735 g.) in 1.5 N sodium hydroxide (8.25 ml.) and then with dilute hydrochloric acid, affords the product N-5β-chol-3-en-24-oyl DL-alanine.

EXAMPLE 5

N-5β-chola-$\Delta^{3,22}$-dien-24-oyl sarcosine

By substituting an equivalent amount of $\Delta^{3,22}$-5β-choladienic acid and methyl chloroformate for the 5β-cholanic acid and ethylchloroformate of Example 1 and following substantially the procedure described therein there is thus obtained a solution of $\Delta^{3,22}$-5β-cholenic methylcarbonic anhydride which, upon treatment with a solution of sarcosine (0.735 g.) in 1.5 N sodium hydroxide (8.25 ml.) and then with dilute hydrochloric acid, affords the product N-5β-chola-$\Delta^{3,22}$-dien-24-oyl sarcosine.

The products of this invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams (i.e., from 5 to about 500 milligrams) of the active ingredient for the symptomatic adjustment of the dosage to the patient to be treated. These dosages are well below the toxic or lethal dose of the products.

A suitable dosage form of the products of this invention can be prepared by mixing 50 mg. of a suitable N-5β-cholan-24-oyl sarcosine with 144 mg. of lactose and 6 mg. of magnesium stearate and placing the 200 mg. mixture into a No. 3 gelatin capsule. Similarly, by employing more of the active ingredient and less lactose, other dosage forms can be put up in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds with other known hypocholesterolemics and hypolipemics or with other desired therapeutic and/or nutritive agents in dosage unit form.

The following example is included to illustrate the preparation of a representative dosage form:

EXAMPLE 6

Dry-filled capsules containing 50 mg. of active ingredient per capsule

|  | Per capsule, mg. |
|---|---|
| N-5β-cholan-24-oyl sarcosine | 50 |
| Lactose | 144 |
| Magnesium stearate | 6 |
| Capsule size No. 3 | 200 |

The N-5β-cholan-24-oyl sarcosine is reduced to a No. 60 powder and then lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredients of the above example by any of the other novel compounds of this invention.

It will be apparent from the foregoing description that the N-5β-cholan-24-oyl sarcosine of this invention and their salts constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A compound of the formula:

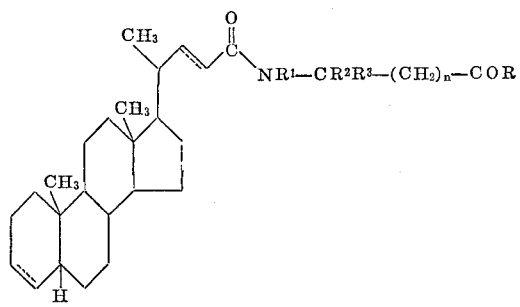

wherein R is hydroxy, alkoxy, —OM wherein M is a cation derived from a metal of the first group of the Periodic System or —NR⁴R⁵ wherein R⁴ and R⁵ are similar or dissimilar members selected from hydrogen and lower alkyl and, when R is hydroxy, the nontoxic pharmacologically acceptable acid addition salts of the resulting acid; $R^1$, $R^2$ and $R^3$ are similar or dissimilar members selected from hydrogen and lower alkyl at least one of which is lower alkyl and $n$ is an integer having a value of zero or one; and wherein the dotted lines in the 3 and 22-positions indicate that the compound may or may not contain one or two unsaturated double bonds and indicates also that the double bond within the ring may be in the 3, 7 or 11 position.

2. A compound according to claim 1 of the formula:

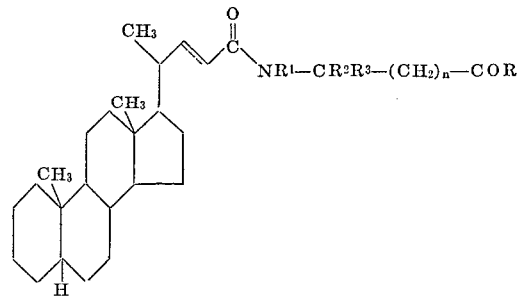

wherein R is hydroxy, alkoxy, —OM wherein M is a cation derived from a metal of the first group of the Periodic System or —NR⁴R⁵ wherein R⁴ and R⁵ are similar or dissimilar members selected from hydrogen and lower alkyl and, when R is hydroxy, the nontoxic pharmacologically acceptable acid addition salts of the resulting acid; $R^1$, $R^2$ and $R^3$ are similar or dissimilar members selected from hydrogen or lower alkyl and $n$ is an integer having a value of zero or one; and wherein the dotted line indicates that the product may or may not contain an unsaturated double bond in the 22-position.

3. A compound according to claim 1 on the formula:

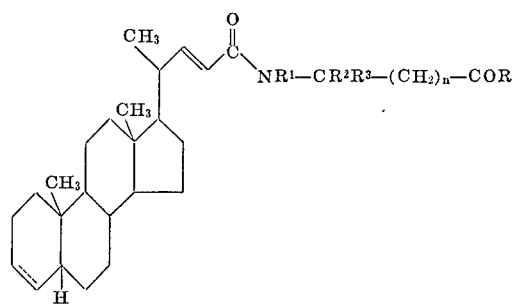

wherein R is hydroxy, alkoxy, —OM wherein M is a cation derived from a metal of the first group of the Periodic System or —NR⁴R⁵ wherein R⁴ and R⁵ are similar or dissimilar members selected from hydrogen and lower alkyl and, when R is hydroxy, the nontoxic pharmacologically acceptable acid addition salts of the resulting acid; $R^1$, $R^2$ and $R^3$ are similar or dissimilar members selected from hydrogen or lower alkyl and $n$ is an integer having a value of zero or one and wherein the dotted line indicates that the compound contains a double bond in the 3, 7 or 11 position.

4. A compound according to claim 1 of the formula:

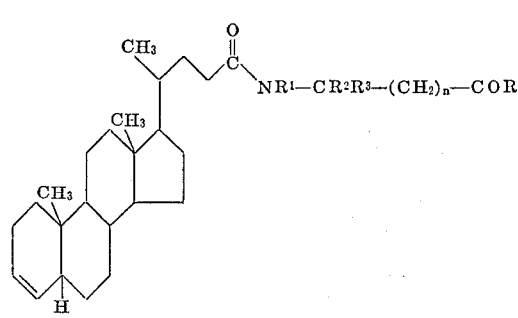

wherein R is hydroxy, alkoxy, —OM wherein M is a cation derived from a metal of the first group of the Periodic System or —NR⁴R⁵ wherein R⁴ and R⁵ are similar or dissimilar members selected from hydrogen and lower alkyl and, when R is hydroxy, the nontoxic pharmacologically acceptable acid addition salts of the resulting acid; $R^1$, $R^2$ and $R^3$ are similar or dissimilar members selected from hydrogen or lower alkyl and $n$ is an integer having a value of zero or one.

5. A compound according to claim 2 of the formula:

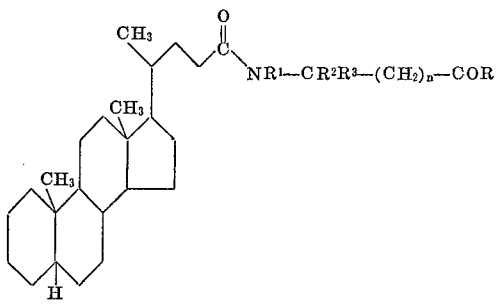

wherein R is hydroxy, alkoxy, —OM wherein M is a cation derived from a metal of the first group of the Periodic System or —NR$^4$R$^5$ wherein R$^4$ and R$^5$ are similar or dissimilar members selected from hydrogen and lower alkyl and, when R is hydroxy, the nontoxic pharmacologically acceptable acid addition salts of the resulting acid; R$^1$, R$^2$ and R$^3$ are similar or dissimilar members selected from hydrogen or lower alkyl and $n$ is an integer having a value of zero or one.

6. The compound according to claim 5 wherein R is hydroxy; R$^1$ is methyl, R$^2$ and R$^3$ are hydrogen and $n$ is zero, and the alkali metal and alkaline earth metal salts thereof.

7. A compound according to claim 5 wherein R is hydroxy, R$^1$ is hydrogen, R$^2$ is hydrogen, R$^3$ is methyl and $n$ is zero, and the alkali metal and alkaline earth metal salts thereof.

8. A compound according to claim 5 wherein R is hydroxy, R$^1$ is hydrogen, R$^2$ and R$^3$ are hydrogen and $n$ is one, and the alkali metal and alkaline earth metal salts thereof.

9. N-5β-cholan-24-oyl sarcosine.
10. N-5β-cholan-24-oyl DL-alanine.
11. N-5β-cholan-24-oyl β-alanine.

References Cited
UNITED STATES PATENTS 3,580,936   5/1971   Patchett et al. _____ 260—397
3,534,070   10/1970  Shigeru et al. _____ 260—397.1

ELBERT L. ROBERTS, Primary Examiner

U.S. Cl. X.R.

260—112.5